US007580802B2

(12) United States Patent
Moen

(10) Patent No.: US 7,580,802 B2
(45) Date of Patent: Aug. 25, 2009

(54) METHOD OF DETERMINING CONDITION OF A TURBINE BLADE, AND UTILIZING THE COLLECTED INFORMATION FOR ESTIMATION OF THE LIFETIME OF THE BLADE

(75) Inventor: Lyder Moen, Tananger (NO)

(73) Assignee: Dynatrend AS (NO)

( * ) Notice: Subject to any disclaimer, the term of this patent is extended or adjusted under 35 U.S.C. 154(b) by 486 days.

(21) Appl. No.: 10/522,692

(22) PCT Filed: Jul. 30, 2003

(86) PCT No.: PCT/NO03/00262

§ 371 (c)(1),
(2), (4) Date: Jul. 29, 2005

(87) PCT Pub. No.: WO2004/012155

PCT Pub. Date: Feb. 5, 2004

(65) Prior Publication Data

US 2006/0074568 A1 Apr. 6, 2006

(30) Foreign Application Priority Data

Jul. 30, 2002 (NO) .................................. 20023609

(51) Int. Cl.
*G06F 19/00* (2006.01)
(52) U.S. Cl. ............................ 702/56; 702/34; 702/42; 73/579; 700/287
(58) Field of Classification Search .................... 702/34, 702/42, 56, 76, 104, 183, 184; 73/577, 116, 73/579, 582, 630, 649, 660; 700/287; 706/47, 706/59, 61
See application file for complete search history.

(56) References Cited

U.S. PATENT DOCUMENTS

| 4,955,269 | A |   | 9/1990 | Kending et al. |
| 5,097,711 | A |   | 3/1992 | Rozelle et al. |
| 5,571,966 | A | * | 11/1996 | Tsuboi ........................ 73/579 |
| 5,625,966 | A | * | 5/1997 | Perotto et al. ............... 36/117.2 |
| 5,736,643 | A |   | 4/1998 | Bores et al. |
| 6,481,211 | B1 | * | 11/2002 | Haas ............................ 60/782 |
| 6,521,293 | B1 | * | 2/2003 | Kojima et al. ................ 427/250 |
| 6,532,433 | B2 | * | 3/2003 | Bharadwaj et al. .......... 702/182 |
| 6,601,005 | B1 |   | 7/2003 | Eryurek et al. |
| 6,757,668 | B1 | * | 6/2004 | Goebel et al. .................. 706/59 |
| 7,065,471 | B2 | * | 6/2006 | Gotoh et al. ................. 702/183 |
| 2004/0148129 | A1 | * | 7/2004 | Gotoh et al. ................. 702/183 |
| 2006/0253268 | A1 | * | 11/2006 | Antoine et al. .............. 702/184 |

FOREIGN PATENT DOCUMENTS

EP 0465696 7/1990
GB 2318873 5/1998

* cited by examiner

*Primary Examiner*—Carol S Tsai
(74) *Attorney, Agent, or Firm*—Andrus, Sceales, Starke & Sawall, LLP

(57) ABSTRACT

A method for determining the condition of a turbine blade (2, 4) in a compressor and utilizing the collected information in an estimation of the lifetime of the turbine blade (2, 4), whereby a measured value reflecting the condition of the turbine blade (2, 4) is generated by a vibration sensitive sensor (10) connected to the compressor's (1) casing (6).

10 Claims, 2 Drawing Sheets

METHOD OF DETERMINING CONDITION OF A TURBINE BLADE, AND UTILIZING THE COLLECTED INFORMATION FOR ESTIMATION OF THE LIFETIME OF THE BLADE

BACKGROUND OF THE INVENTION

The estimation of the lifetime of a turbine blade, whereby the remaining lifetime may be determined, is of great importance in the planning of maintenance intervals. Prior methods of estimation were based exclusively on operating time, as the lifetime of a turbine blade was set to an operating time during which it could, with reasonable certainty, be assumed that the turbine blade would exhibit satisfactory operation regardless of the loading exposed to the turbine blade during the operating time.

Obviously, such relatively simple lifetime estimation led to excessively frequent maintenance intervals, and the thus subsequent replacement of turbine blades that had been subjected to relative small loads during their operating time. Prior art now comprises lifetime estimation methods that to some extent are quite complicated, in which parameters such as power loading, failures in both the component being monitored and in nearby components, wear, and also faults in the measuring equipment used to measure the loading, are taken into account in addition to operating time.

For a turbine blade in a multi-stage axial compressor, it has been proven that rotating stall may cause overloading of the turbine blade with subsequent damage and compressor breakdown, without the condition being detected by equipment and methods according to prior art. Rotating stall can occur in a turbine stage when the air approaches the turbine blade at the wrong angle. This may cause the flow to separate in the boundary layer between blade and air (boundary separation), whereby a varying flow is generated at one or more locations along the periphery of the stage. When a first turbine blade is subjected to this condition, the air flow is deflected towards a nearby turbine blade, which is then overloaded while the other nearby turbine blade is relieved. This causes the overloaded turbine blade to be subjected to stall, whereby the first turbine blade is relieved. Thus rotating stall propagates along the periphery of the stage at a speed of approximately half the speed of rotation of the turbine.

According to prior art the compressor is monitored by measuring its performance. The measured values resulting from the measurements form part of the input values in a lifetime estimation tool. The measurements are compared with anticipated values, as the anticipated lifetime of the component in question or the entire turbine is affected by whether the measured value is greater or smaller than an anticipated value. However, this form of monitoring is not designed to allow determination of which compressor stage is being subjected to stall.

SUMMARY OF THE INVENTION

In order to remedy the disadvantages of the prior art, this invention regards a method of determining the condition of a turbine blade and utilizing the collected information in an estimation of the lifetime of the turbine blade. In particular, it regards a method of determining when the turbine blade is subjected to an undesirable condition, e.g. in the form of so-called "rotating stall", whereupon the measured and processed information is used as part of the input information into a lifetime estimation program. The invention also regards a device for implementation of the invention. In this context, the condition of a turbine blade means the type of loading to which the turbine blade is subjected. The condition (operating state) may for example be normal operation, rotating stall, etc.

These and other objects of the present invention will become more readily appreciated and understood from a consideration of the following detailed description of the exemplary embodiments of the present invention when taken together with the accompanying drawings, in which:

DETAILED DESCRIPTION OF THE INVENTION

Figure 1:
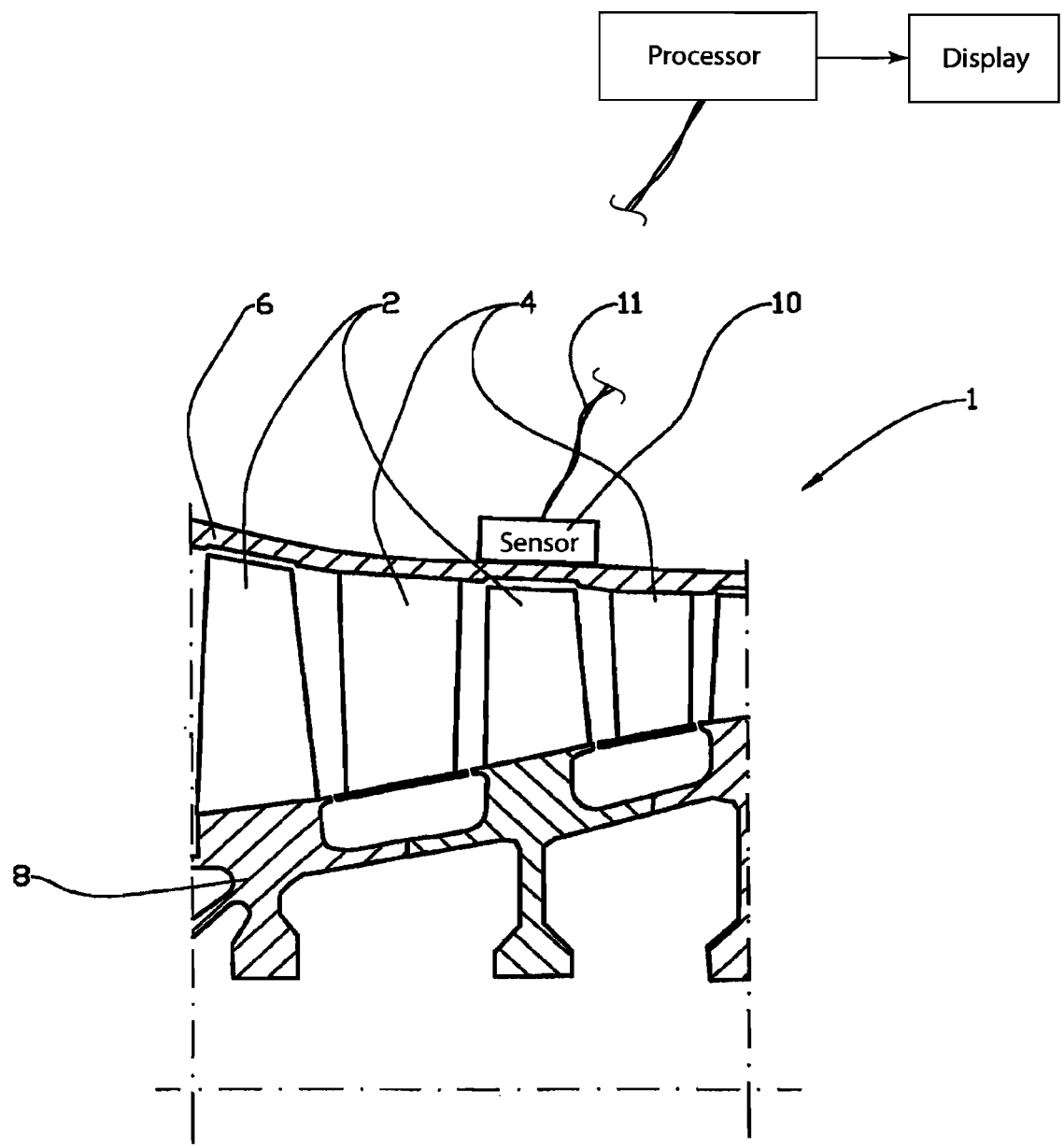
FIG. 1 shows an axial section through a compressor.

Trials have shown that representative and reliable measurement values that indicate the condition of the turbine blade may be obtained by means of a vibration sensitive sensor in the form of an accelerometer or other vibration sensitive instrument mounted on the turbine casing. The sensor is mounted at or in relative proximity to the compressor stage(s) to be monitored.

Mounting the sensor on the outside of the compressor casing makes it unnecessary to provide through bores in the compressor casing, such as is common in connection with pressure measurements. In a compressor casing for e.g. an air craft, it is not practicable to drill the casing after certification.

The sensor picks up acoustically generated pressure waves from the turbine blades by the pressure waves propagating through the air to the compressor casing, causing the compressor casing to vibrate.

The measurement signal from the sensor is processed e.g. by means of so-called "Fast Fourier Transform" (FFT), in which the measurement signal is converted into measured values corresponding to those frequencies at which they normally occur, and by means of other signal processing filters that are known per se.

Measured values from several compressor stages where the stages have the same number of turbine blades, may if so desired be combined into one common set of measured values/measurements.

The measured values distributed over a frequency range are then compared with anticipated values at each of the corresponding frequencies. If the measured value at a frequency exceeds or falls below a predetermined measurement interval, a signal of the measured value is transmitted to a lifetime estimation device, and the estimated lifetime is corrected in order to take into account the condition of the turbine blade in question.

In the boundary area between normal operation and rotating stall, the blade pass frequency of the compressor stage will be somewhat unstable and will fluctuate. By stating limits for the fluctuation, this condition can also be included in the lifetime estimation.

As mentioned above, rotating stall will propagate around the rotor at a speed of approximately half (50 to 70%) the speed of rotation of the turbine. The vibration energy generated by the rotating stall may be used as additional information in the lifetime estimation. However, the vibrational energy generated may be too low to be used as an indicator if rotating stall is occurring in one compressor stage only.

In the drawings, reference number 1 denotes a section of a compressor comprising several compressor stages 2 with associated stator stages 4, compressor casing 6 and rotor 8.

On the compressor casing 6 there is placed a vibration sensitive sensor 10 connected via an electric line 11 to a signal processing device (not shown) of a type that is known per se.

Figure 2:
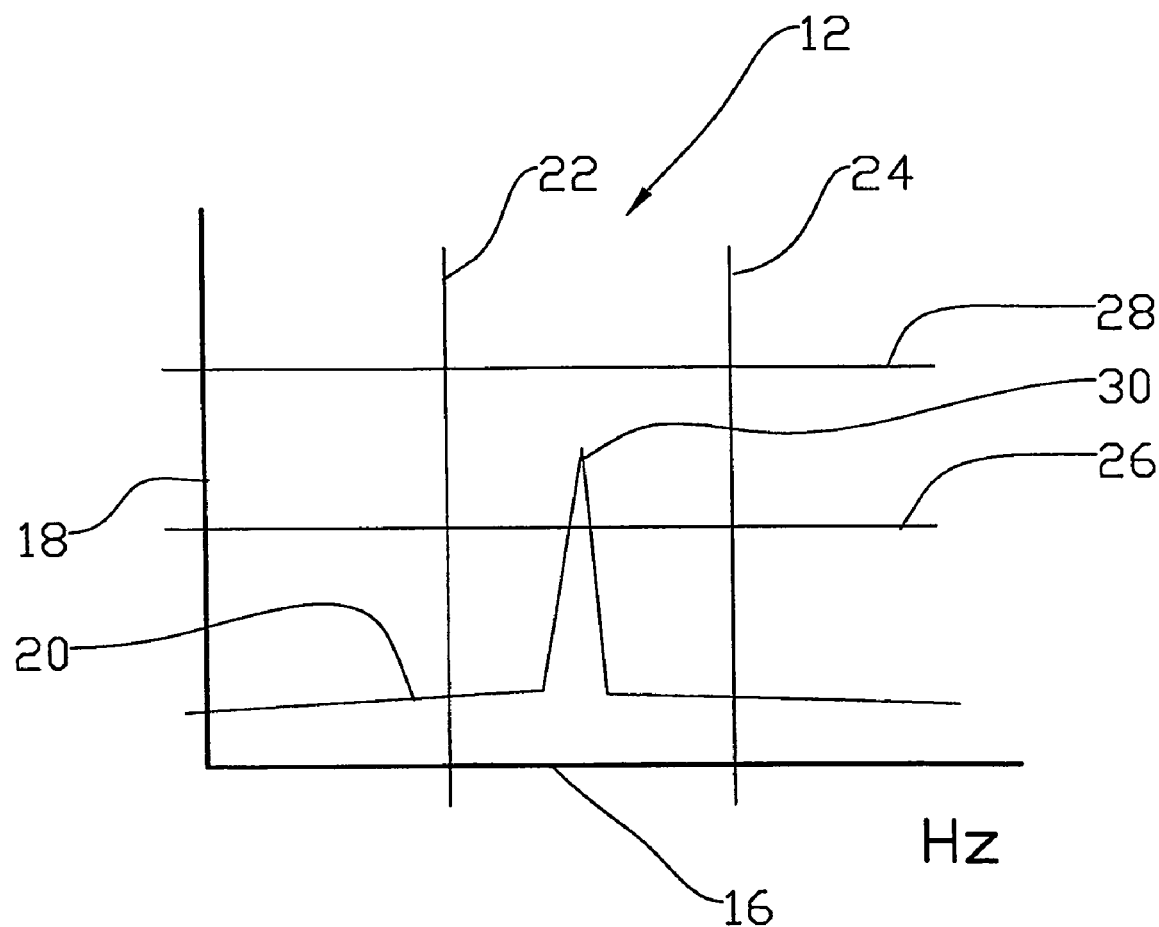
FIG. 2 shows a simplified diagram representing the analysis of the measured values.

After the signals from the sensor 10 have been processed in the signal processing device (not shown), they may be presented graphically as a diagram 12, see FIG. 2.

The frequency range in question is distributed along the abscissa 16 of the diagram, while the ordinate 18 of the diagram 12 indicates the measured values. The processed signal is displayed as a curve 20.

Within a frequency range defined by line 22, the so-called "high pass" limit, and by line 24, the so-called "low pass" limit, in the diagram 12, a lower limit 26 and an upper limit 28 have been determined on the basis of empirical values, within which the peak level 30 of the curve 20 in said frequency range is located during normal operation.

Were a situation to occur in the compressor stage 2 in question, in which the air supply becomes too small, the value of the peak level 30 will fall below value 26. This condition is communicated to the unit estimating the lifetime of the component. Similarly, if rotating stall were to occur, the peak value 30 would rise to a level higher than value 28, whereby a report on this condition is communicated to the lifetime estimation device.

The abscissa 12 of the diagram may be divided into as many frequency ranges as required, with individual limit values for each range. Typically, compressor stages with different numbers of turbine blades have separate frequency ranges, as the turbine blade pass frequency, which is equal to the speed of rotation multiplied by the number of blades, is different, thereby occurring at different abscissa positions in the diagram 12.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

What is claimed is:

1. In a compressor having a series of turbine blades that are housed in a casing and rotate at a blade pass frequency, wherein certain movements of the turbine blades generate pressure waves that propagate to the casing and thereby cause the casing to vibrate, a method of estimating the operable life of turbine blades in the compressor, said method comprising the steps of:
    monitoring blade pass frequency of the turbine blades;
    sensing fluctuations in said blade pass frequency to identify a developing condition of rotating stall;
    sensing vibrations in the casing caused by movement of the turbine blades;
    correlating the sensed vibrations to a frequency value representative of the vibration frequency of the casing;
    identifying when the turbine blades are subjected to a condition of rotating stall by determining when said frequency value is outside of a known range of frequency values of the casing during normal turbine blade operation; and
    factoring the identified developing condition of rotating stall and the identified condition of rotating stall into an estimation of the operable life of a turbine blade in the compressor.

2. The method according to claim 1, wherein the step of correlating the sensed vibrations to the frequency value includes the step of comparing the sensed vibrations to a known correlation between casing vibrations and casing frequency values.

3. The method according to claim 2, wherein the step of correlating the sensed vibrations to the frequency value utilizes Fast Fourier Transform.

4. A system configured to estimate the operable life of turbine blades in a compressor, the system comprising:
    a compressor having a plurality of turbine blades that are housed in a casing and rotate at a predetermined blade pass frequency, wherein certain movements of the turbine blades generate pressure waves that propagate to the casing and thereby cause the casing to vibrate;
    a sensor coupled to the casing, wherein the sensor is configured to sense vibrations in the casing and to generate a measurement signal representative of the sensed vibrations; and
    a processor coupled to the sensor, wherein the processor is configured to receive the measurement signal from the sensor and to correlate the measurement signal to a frequency value representative of the vibration frequency of the casing;
    wherein the processor is further configured to identify when the turbine blades are subjected to a condition of rotating stall by determining when said frequency value is outside of a known range of frequency values for the casing during normal turbine blade operation;
    wherein the processor is further configured to identify a developing condition of rotating stall based upon fluctuations in the blade pass frequency of the turbine blades;
    wherein the processor is further configured to communicate a developing condition of rotating stall and an identified condition of rotating stall to a lifetime estimation tool configured to estimate the operable life of turbine blades in the compressor; and
    wherein the lifetime estimation tool is configured to estimate the operable life of turbine blades in the compressor based at least in part on the developing condition of rotating stall and the identified condition of rotating stall.

5. The system according to claim 4, comprising a display, wherein the processor is configured to display the frequency values of the casing on the display.

6. The system according to claim 5, wherein the processor is further configured to display the known range of frequency values of the casing during normal turbine blade operation on the display.

7. The system according to claim 4, wherein the processor converts the measurement signal into the frequency condition by comparing the measurement signal to a known correlation between measurement signals and frequency conditions.

8. The system according to claim 7, wherein the processor is configured to utilize Fast Fourier Transform to perform the conversion.

9. The system according to claim 4, wherein the sensor is an accelerometer.

10. The system according to claim 4, wherein the sensor is mounted on an outside surface of the casing with respect to the turbine blades.

* * * * *

UNITED STATES PATENT AND TRADEMARK OFFICE
CERTIFICATE OF CORRECTION

PATENT NO. : 7,580,802 B2  Page 1 of 1
APPLICATION NO. : 10/522692
DATED : August 25, 2009
INVENTOR(S) : Lyder Moen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Fourteenth Day of September, 2010

David J. Kappos
*Director of the United States Patent and Trademark Office*